Sept. 19, 1967

B. SUCHOWSKI 3,341,968

DOLL CRADLE WITH PHONOGRAPH

Filed July 21, 1965

INVENTOR.
BERNARD SUCHOWSKI
BY James and Franklin
ATTORNEYS

Sept. 19, 1967  B. SUCHOWSKI  3,341,968
DOLL CRADLE WITH PHONOGRAPH
Filed July 21, 1965  3 Sheets-Sheet 2
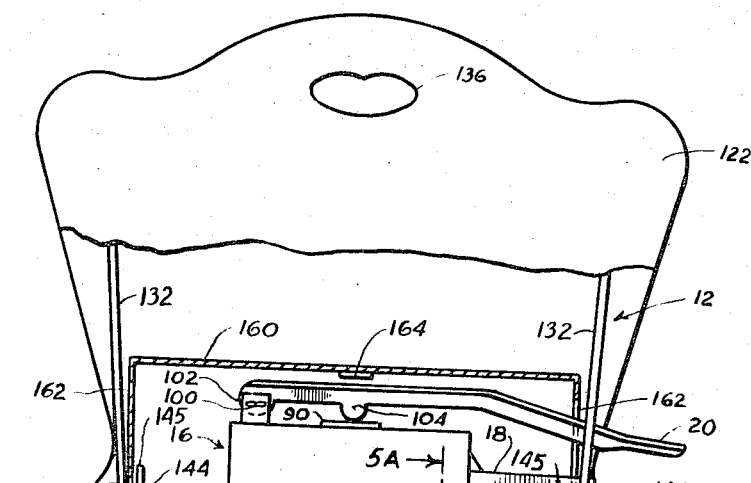
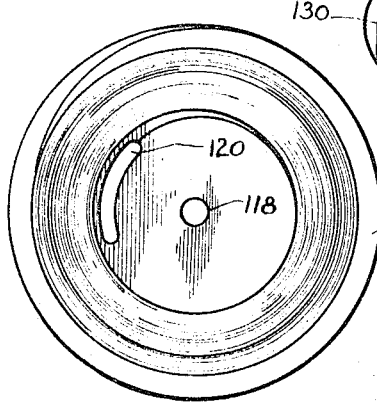
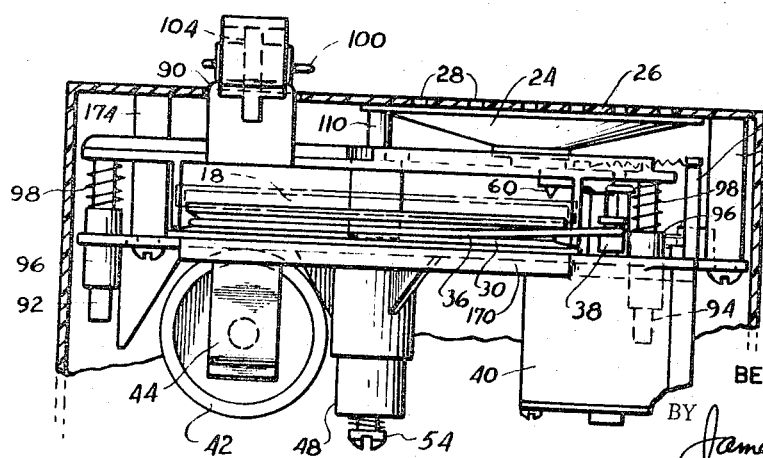
INVENTOR.
BERNARD SUCHOWSKI
BY James and Franklin
ATTORNEYS Sept. 19, 1967  B. SUCHOWSKI  3,341,968
DOLL CRADLE WITH PHONOGRAPH
Filed July 21, 1965  3 Sheets-Sheet 3
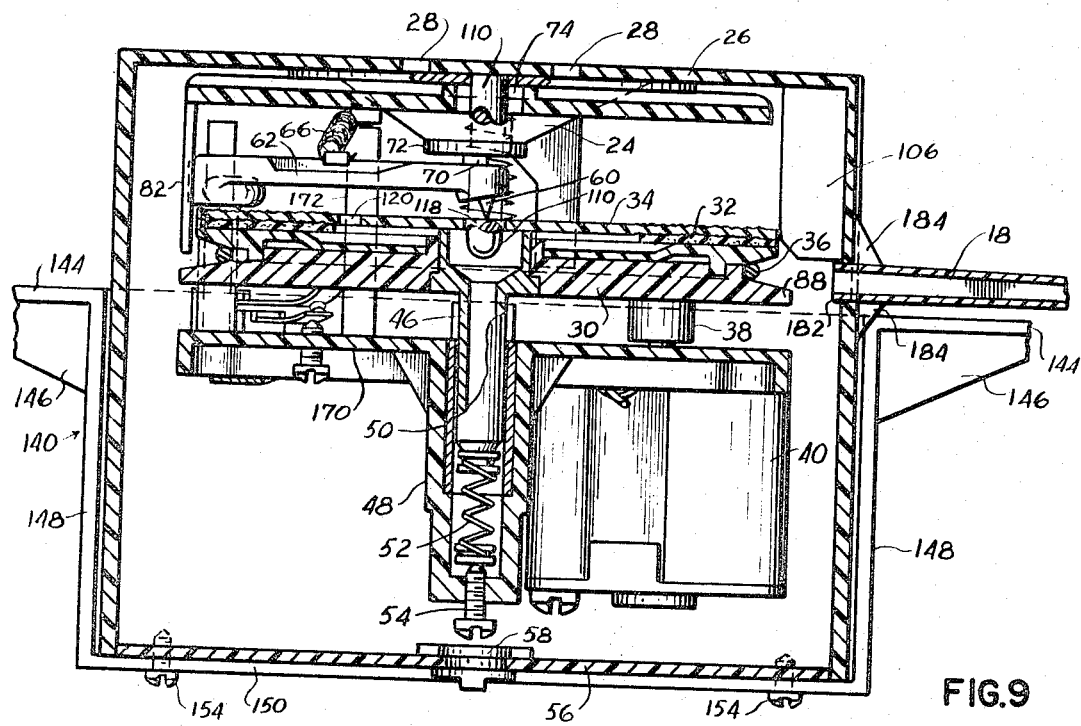
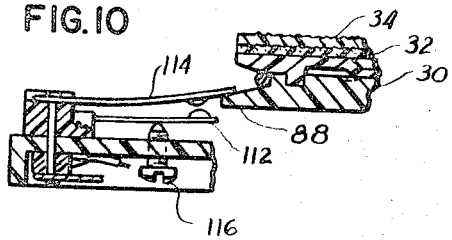
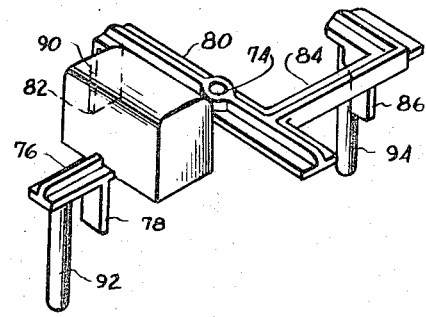
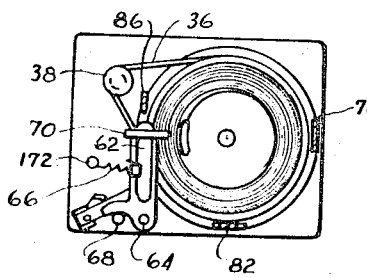
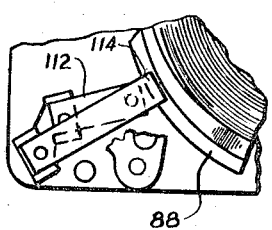
INVENTOR.
BERNARD SUCHOWSKI
BY
*James and Franklin*
ATTORNEYS 3,341,968
DOLL CRADLE WITH PHONOGRAPH
Bernard Suchowski, Howard Beach, N.Y., assignor to American Character, Inc., Brooklyn, N.Y., a corporation of New York
Filed July 21, 1965, Ser. No. 473,691
8 Claims. (Cl. 46—15)

This invention relates to toys, and more particularly to cradles for dolls.

The general object of the present invention is to improve doll cradles. A more specific object is to combine a doll cradle with a toy phonograph, and more particularly a phonograph wtih a changeable record, of the type disclosed in my copending application Ser. No. 473,656, filed July 21, 1965.

The said phonograph is loaded through a slot, and in accordance with features and objects of the present invention the ends of the cradle are provided with rockers, and a record chute extends from the phonograph to one side of the cradle. The cradle then may be conveniently tilted in one direction for gravitational loading of a record through the chute into the phonograph, and may be tilted in opposite direction for gravitational discharge of the record from the phonograph.

To accomplish the foregoing general objects, and other more specific objects which will hereinafter appear, my invention resides in the toy cradle and phonograph elements and their relation one to another, as are hereinafter more particularly described in the following specification. The specification is accompanied by drawings in which:

FIG. 5 is a transverse section taken approximately in the plane of the line 5—5 of FIG. 1;

FIG. 5A is a fragmentary section through one of two phonograph supports, and taken approximately on the line 5A—5A in FIG. 5;

FIG. 6 is a plan view of a record used in the phonograph;

FIG. 7 is a vertical section taken approximately on the line 7—7 of FIG. 2;

FIG. 8 is a transverse vertical section drawn to larger scale and taken approximately on the line 8—8 of FIG. 2;

FIG. 9 is a perspective view showing a yoke forming a part of the phonograph;

FIG. 12 is a fragmentary vertical section drawn to enlarged scale and explanatory of an electrical switch forming a part of the phonograph;

FIG. 11 is a fragmentary plan view of the switch; and

FIG. 12 is a partially sectioned plan view drawn to reduced scale, and taken beneath the diaphragm and above the stylus arm of the phonograph.

Figure 1:
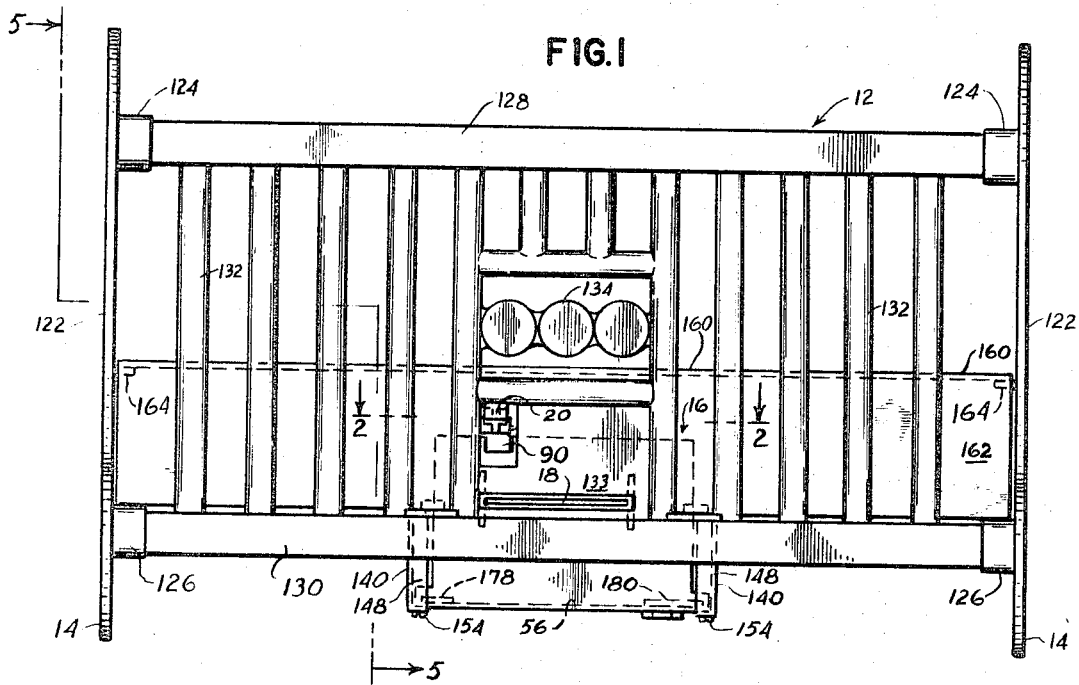
FIG. 1 is a front elevation of a doll cradle embodying features of my invention.

Referring to the drawings and more particularly to FIGS. 1 and 5, the doll cradle comprises a cradle body 12, with rockers 14 at the ends of said body on which the body may be rocked from side to side. The cradle carries a toy phonograph generally designated 16, this being used with changeable records. The internal phonograph mechanism is much the same as that disclosed in my aforesaid copending application Ser. No. 473,656, filed July 21, 1965.

The cradle is provided with a record chute 18 (FIGS. 1, 2, 5 and 8) which extends from the side of the cradle to the phonograph 16. The chute 18 is a flat rectangle in cross-section, as will be seen in FIG. 1, and is dimensioned to freely receive the size phonograph record used by the phonograph (in this case 2¾ inch in diameter). The chute 18 is substantially horizontal when the cradle is horizontal, that is, in its rest position shown in FIG. 5. A phonograph control lever 20 extends from the phonograph to one side of the cradle body, preferably through the same side of the cradle body as the chute 18. In the particular mechanism here shown the lever serves as a starting device when slightly depressed, and serves as a record release element when fully depressed.

Figure 3:
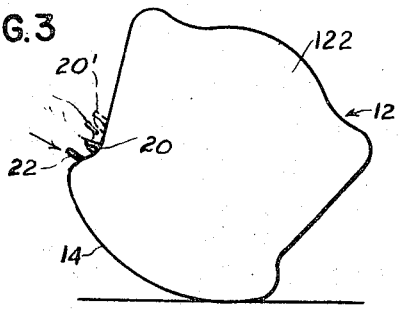
FIG. 3 is a simplified end elevation showing the cradle tilted for loading a record.

Referring now to FIG. 3, it will be seen that the cradle 12 may be tilted on its rockers 14 to bring the outer end of the chute upward for gravitational loading of a record 22 into the phonograph. In FIG. 3 the control lever 20 has been depressed from the broken line position 20' to the solid line position 20, and the trailing end of record 22 is shown sliding into the chute and phonograph. Conversely, and referring to FIG. 4, the cradle 12 may be tilted in opposite direction on its rockers 14 to bring the outer end of the chute downward, for gravitational discharge of record 22 from the phonograph. At this time the lever 20 again is held in its depressed position in order to release the record for discharge.

Figure 2:
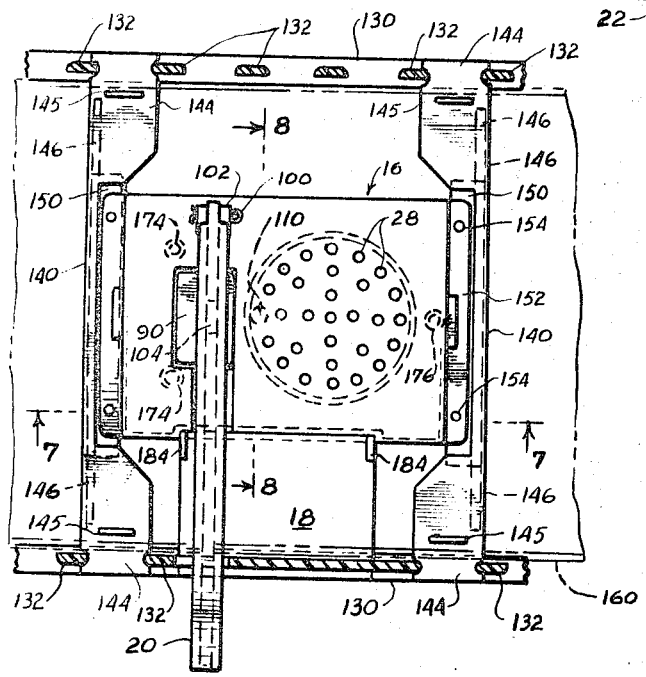
FIG. 2 is a fragmentary horizontal section taken approximately in the plane of the line 2—2 of FIG. 1.

Referring now to FIGS. 7 and 8 of the drawing, the phonograph comprises a frustoconical sound reproducing diaphragm 24 mounted on the top wall 26 of the phonograph casing, the said wall having a circular array of sound egress apertures 28. These are also shown in FIG. 2. The phonograph further comprises a turntable 30 having a frictional surface 32 and carrying a disk record 34. The latter preferably has sound grooves on both sides, and the grooves are of the hill-and-dale type.

The turntable 30 is molded of two parts secured together with a "V" rim. The rim acts as a pulley groove, and receives a driving belt 36. This extends to a small diameter pulley 38 (FIGS. 7 and 12) at the upper end of a motor housed at 40, the said motor preferably being of the permanent magnet field type commonly used in toys. It is energized from a single cell of the flashlight type, shown at 42 in FIG. 7, and disposed between spaced resilient metal contact brackets, one of which is indicated at 44. The illustrated cell is of the D size.

The turntable is carried by a spindle 46 (FIG. 8) which is slidable as well as rotatable in a bearing housing 48, the latter preferably being lined with a self lubricating bearing 50. The spindle and turntable are urged upward by a compression spring 52, the force of which is adjustable by means of a screw 54, and the bottom panel 56 of the phonograph housing, although removable, may be provided with a hole 58 beneath screw 54 for access thereto. The adjustment of screw 54 varies the stylus pressure and may be used as a speed regulating means.

The stylus 60 (FIG. 8) is carried at the end of a stylus arm 62 which is pivoted at 64 (FIG. 12) and is normally urged outward by a light pull spring 66. Its outward movement is limited by a fixed stop 68, so located as to bring the stylus over the starting groove of the record. The top of the stylus arm 62 carries a slide bar 70, the top of which is smooth, and bears against the smooth bottom of a disk 72 (FIG. 8) which is secured beneath the diaphragm 24. In this way the vertical vibration of the stylus is transmitted directly to the diaphragm, while affording lateral sliding movement of the bar beneath the disk as the stylus arm tracks for a desired distance over the face of the record.

The phonograph is controlled with the aid of an element best shown in FIG. 9, and which may be referred to as a yoke. It is disposed over the record and turntable, with the hole 74 over the axis of the turntable. It comprises an arm 76 having a depending finger 78; an arm 80 having a depending finger 82; and an arm 84 having a depending finger 86. These fingers fit around or straddle the record, as will be seen by their location in FIG. 12 at 78, 82 and 86. The lower edge 88 (FIG. 8) of the turntable projects to a radius somewhat larger than the record, and the fingers bear against this projecting part of the turn table, so that the yoke may be depressed to depress the turntable.

The yoke is preferably provided with a depressible push button 90, and with guide pins 92 and 94. The latter are slidably received in mating bearings indicated at 96 in FIG. 7, and may be surrounded by light compression springs 98 which normally raise the yoke to the elevated rest position shown in FIG. 8. In FIG. 7 the yoke has been depressed to push the turn table to its "down" or record changing position, so that the record, not shown in FIG. 7, is aligned with the chute 18, located as shown in broken lines.

Referring now to FIGS. 2 and 5, the lever 20 is pivoted at 100, as by means of a cotter pin passing through bearing ears 102. The lever has a projection 104 which is preferably rounded and bears against the button 90, so that depression of the outer end 20 of the lever depresses the button 90.

The phonograph mechanism is mounted on a generally rectangular base 170, and the motor housing 40 and bearing housing 48 are molded integrally with the base 170, preferably out of a plastics material. The sleeves 96 (FIG. 7) for the yoke guide pins 92 are also molded integrally with the base 170, and the same applies to the pivot 64 (FIG. 12) of the stylus arm; the stop 68 for the stylus arm; and the post 172 for the pull spring 64. The base 170 is molded with three ears which receive screws for mounting the base in the phonograph housing, and for this purpose the top wall 26 of the housing may be molded integrally with three support posts indicated at 174 and 176 in FIG. 7. The location of these posts is also shown in FIG. 2. The abutment 106 shown in FIG. 8, and also the centering post 110, if used, may be molded integrally with the phonograph housing. The housing may be molded in one piece, except for the removable bottom 56, and the latter may be anchored in position by means of lugs 178 (FIG. 1) and a rotatable latch 180.

The chute 18 may be molded in one piece, and in such case it preferably tapers in order to facilitate the molding operation. When tapered it is preferably made smaller at its outer end, as shown in FIG. 8. The inner end 182 is provided with four small struts or webs 184, displaced from the end 182, the latter being cemented in a mating rectangular opening in the side wall of the housing, and the struts 184 also being cemented to the housing wall.

The three fingers 78, 82 and 86 of the yoke serve to receive and to locate a record being loaded into the phonograph. The fourth side has no finger because that is the side from which the record is loaded. However, referring to FIG. 8, there is a stationary abutment 106 on the fourth side which acts as a centering means when the turntable is raised. It is therefore not necessary to employ a centering pin or post. However, a fixed centering post is readily provided if desired, and such a post is shown at 110 in FIG. 8. It may be molded integrally with the top 26 of the phonograph casing, or it may be cemented in a socket. It projects downward through the hole 74 in the yoke, and its lower end enters the center hole of the record 34 when the record is in playing position. However, when the turntable is depressed to its record changing position the record leaves the lower end of the post, and at that time the record is in alignment with the chute 18, so that it can be dicharged from the phonograph.

Referring to FIG. 12, and assuming a record has been played, a slight depression of the turntable and record will release the stylus from the record grooves, whereupon the stylus arm 62 is swung outward by its spring 66 to starting position. The record in the phonoraph then is repeated. At the end of the record the phonograph is stopped, and for this purpose the phonograph is provided with a "no record" switch which acts also as an "end-of-record" switch.

Referring to FIGS. 10 and 11 the switch comprises a stationary lower spring leaf or contact 112, and a movable upper spring leaf or contact 114. The end of the latter overlies the projecting lower edge 88 of the turntable 30. The position of the lower leaf 112 is so adjusted by means of an adjustment screw 116 that the switch is closed when the turntable is in its normal playing position. However, in the absence of a record 34 on the turn table, the latter rises somewhat higher than normal before reaching the stylus, and this extra lift opens the switch. The switch is connected in series between the battery cell 42 and the driving motor housed at 40, and so the phonograph is stopped if there is no record on the turntable.

Referring now to FIG. 6, the record 34 has the usual center hole 118, and in addition has an arcuate slot 120 into which the terminal groove of the record leads. It will be evident that at the end of the record when the stylus enters the slot 120 the turntable is permitted to rise an extra amount, the same as though no record were present, and this opens the switch and stops the phonograph. Thus by using a special termination in the record, the no-record switch is made to act also as an end-of-record switch.

Referring now to FIGS. 1 and 2 of the drawing, the particular cradle here shown is molded out of a plastics material, and comprises two end walls 122, curved at the bottom to provide the two rockers 14 previously referred to. Each end wall is integrally molded with two upper sockets 124, and two lower sockets 126.

The cradle further comprises two sides each made up of a horizontal top rail 128, a bottom rail 130, and a large number of upright slats 132 therebetweeen. The far or backside of the cradle may differ slightly from the front side shown in FIG. 1, because the front side is modified to include a panel 133 having a horizontal slot to receive the outer end of the record chute 18. It also has a vertical slot which receives the outer end of the control lever 20. The ornamentation shown at 134 in FIG. 1 is not at all essential, but when used, may be provided on both sides of the cradle. It will be understood that the rails and slats and ornamentation are all molded integrally, so that each side of the cradle is a single structural member. The ends also may be ornamented, or molded, with ornamentation not here shown.

The ends of the upper rail 128 are received in the upper sockets 124, and ends of the lower rail 130 are received in the lower sockets 126. The four parts may be permanently assembled, as by the use of a suitable cement or adhesive. The rails 128 and 130 may be channel shaped, with the channel opening inward as shown at 130 in FIG. 5. The large cradle ends 122 may be ornamented as molded, and an upper opening 136 shown in FIG. 2 may act also as a hand hold for carrying the cradle.

The phonograph is housed in a generally rectangular housing, and this is secured in the cradle by means of a pair of supports 140. Referring to FIG. 5 the support 140 comprises a rectangular wall 142, with outwardly projecting arms 144 strengthened by triangular struts or webs 146. FIG. 2 shows how the arms 144 are received over and rest on the lower rails 130 between pairs of adjacent slats 132, the arms 144 preferably being notched somewhat to fit between the slats and to prevent movement in the direction of the arms, that is, across the rails 130.

Referring to FIGS. 1 and 5, the supports 140 each has two upright flanges 148 and a bottom flange 150 (FIG. 5) on which the phonograph housing rests. FIG. 5A shows how bottom flange 150 supports the phonograph housing, and the latter may be given a projecting flange 152 for this purpose. The phonograph is locked in the supports by means of screws 154.

With this construction the supports 140 may be lowered into position at the bottom of the cradle; the phonograph then may be placed between the supports; and anchored by the screws 154, which may be applied from the bottom. FIG. 8 also shows how the phonograph housing is received between the upright flanges 148 of the support 140, and rests on the bottom flange 150. FIG. 8 also shows the struts or webs 146 for the support arms 144.

The bottom wall 56 of the phonograph housing may be and preferably is a removable panel, thus affording access to change the battery cell, without removing the phonograph from the cradle.

The cradle is completed by a mattress support, which in this case is simply a piece of stiff cardboard folded to form a flat top 160 and upright sides 162 bent downward therefrom. The lower edges of the sides rest on the bottom rails 130. The top 160 is preferably additionally supported by projections 164 (FIGS. 1 and 5) molded integrally on the inside of the ends 122. The sides 162 may be held against inward movement by four projections 145 (FIGS. 2 and 5) molded integrally on top of the four arms 144 of the brackets 140 which support the phonograph.

The cardboard 160, 162 may be printed with a pattern suitable for a mattress. The height of the support 160 is enough to clear the control lever 20. It also provides ample clearance above the diaphragm of the phonograph for free egress of sound.

Figure 4:
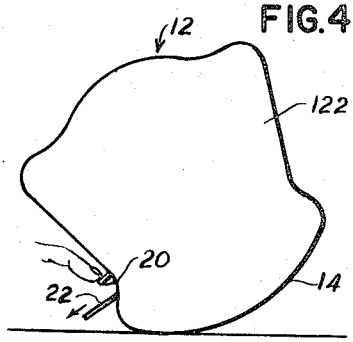
FIG. 4 is a similar view showing the cradle tilted in opposite direction for discharge of a record.

It is believed that the construction and method of assembly of my improved doll cradle, as well as the advantages thereof, will be apparent from the foregoing detailed description. The record changing phonograph combines most aptly with the cradle because tilting the cradle as shown in FIG. 3 facilitates gravitational loading of a new record, and tilting as shown in FIG. 4 facilitates discharge of a previously used record. The record chute 18 and the long control lever 20 permit the phonograph itself to be positioned at the center of the cradle, so that it does not upset the equilibrium or horizontal rest position of the cradle.

It will be apparent that while I have shown and described my improvement in a preferred form, changes may be made without departing from the scope of the invention, as sought to be defined in the following claims.

I claim:

1. A doll cradle comprising a cradle body, rockers at the ends of said body on which said body may be rocked from side to side, a toy phonograph with a changeable record, means mounting the phonograph in the body, a record slot at one side of said phonograph and through which a record may be loaded or discharged, said slot receiving the record in the direction of the rocker ends and transversely of the sides of the cradle, the arrangement being such that the cradle may be tilted on its rockers to bring the slot downward for gravitational discharge of a record from the phonograph, and the cradle may be tilted on its rockers in opposite direction to bring the slot upward for gravitational loading of a record into the phonograph.

2. A doll cradle comprising a cradle body, rockers at the ends of said body on which said body may be rocked from side to side, a toy phonograph with a changeable record, means mounting the phonograph in the body, a record chute extending from one side of said body to said phonograph and through which chute a record may be loaded or discharged, the arrangement being such that the cradle may be tilted on its rockers to bring the outer end of the chute downward for gravitational discharge of a record from the phonograph, and the cradle may be tilted on its rockers in opposite direction to bring the outer end of the chute upward for gravitational loading of a record into the phonograph.

3. A doll cradle comprising a cradle body, rockers at the ends of said body on which said body may be rocked from side to side, a toy phonograph with a changeable record, means mounting the phonograph in the body, a record chute extending from one side of said body to said phonograph and through which chute a record may be loaded or discharged, said chute being substantially horizontal when the cradle is in upright position, and a phonograph control element, the arrangement being such that the cradle may be tilted on its rockers to bring the outer end of the chute downward for gravitational discharge of a record released by said control element, and the cradle may be tilted on its rockers in opposite direction to bring the outer end of the chute upward for gravitational loading of a record into the phonograph.

4. A doll cradle comprising a cradle body, rockers at the ends of said body on which said body may be rocked from side to side, a toy phonograph with a changeable record, means mounting the phongraph in the body, a record chute extending from one side of said body to said phonograph and through which chute a record may be loaded or discharged, said chute being substantially horizontal when the cradle is in upright position, and a phonograph control lever extending from the phonograph to the same side of the body as the chute, the arrangement being such that the cradle may be tilted on its rockers to bring the outer end of the chute downward for gravitational discharge of a record released by said control lever, and the cradle may be tilted on its rockers in opposite direction to bring the outer end of the chute upward for gravitational loading of a record into the phonograph.

5. A doll cradle comprising a cradle body having sides and ends, the sides having top and bottom rails with upright slats therebetween, a toy phonograph, and means mounting the phonograph in the cradle, said means comprising two spaced supports extending transversely of the cradle, each support having arms the ends of which rest on the bottom rail between adjacent pairs of slats, said arm ends being wider than the space between the slats but being notched to receive the slats and to prevent movement in a direction lengthwise of said arms, said supports being secured to the phonograph.

6. A doll cradle comprising a cradle body having sides and ends, rockers at the ends of said body on which said body may be rocked from side to side, the sides having top and bottom rails with upright slats therebetween, a toy phonograph, and means mounting the phonograph in the cradle, said means comprising two spaced supports extending transversely of the cradle, each support having arms the ends of which rest on the bottom rail between adjacent pairs of slats, said arm ends being wider than the space between the slats but being notched to receive the slats and to prevent movement in a direction lengthwise of said arms, said supports including side walls with flanges fitting beneath and secured to the phonograph.

7. A doll cradle as defined in claim 2 in which the sides of the cradle body have top and bottom rails with upright slats therebetween, and the means mounting the phonograph comprises two spaced supports extending transversely of the cradle, each support having arms the ends of which rest on the bottom rail between adjacent pairs of slats, said arm ends being wider than the space between the slats but being notched to receive the slats and to prevent movement in a direction lengthwise of said arms, said supports being secured to the phonograph.

8. A doll cradle as defined in claim 4, in which the sides of the cradle body have top and bottom rails with upright slats therebetween, and the means mounting the phonograph comprises two spaced supports extending transversely of the cradle, each support having arms the ends of which rest on the bottom rail between adjacent pairs of slats, said arm ends being wider than the space between the slats but being notched to receive the slats and to prevent movement in a direction lengthwise of said arms, said supports including side walls with flanges fitting beneath and secured to the phonograph.

References Cited

UNITED STATES PATENTS

| | | | |
|---|---|---|---|
| 2,252,290 | 8/1941 | Konikoff | 46—175 |
| 2,501,861 | 3/1950 | Braun | 46—174 X |
| 2,751,710 | 6/1956 | Pace | 46—175 |

F. BARRY SHAY, *Primary Examiner.*

R. F. CUTTING, *Assistant Examiner.*